United States Patent
Saxton (12)

(10) Patent No.: US 6,370,549 B1
(45) Date of Patent: Apr. 9, 2002

(54) APPARATUS AND METHOD FOR SEARCHING FOR A FILE

(75) Inventor: Thomas W. Saxton, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/224,698

(22) Filed: Jan. 4, 1999

(51) Int. Cl.$^7$ ................................. G06F 17/30
(52) U.S. Cl. ........................ 707/205; 707/200
(58) Field of Search .................. 707/200, 201, 707/202, 204, 205, 203

(56) References Cited

U.S. PATENT DOCUMENTS

| | | | | |
|---|---|---|---|---|
| 5,355,497 A | * | 10/1994 | Cohen-Levy | 395/700 |
| 5,367,671 A | * | 11/1994 | Feigenbaum et al. | 395/600 |
| 5,799,318 A | * | 8/1998 | Cardinal et al. | 707/104 |
| 5,907,837 A | * | 5/1999 | Ferrel et al. | 707/3 |
| 5,978,791 A | * | 11/1999 | Farber et al. | 707/2 |

* cited by examiner

Primary Examiner—Hosain T. Alam
Assistant Examiner—Joon Hwan Hwang
(74) Attorney, Agent, or Firm—Ronald M. Anderson

(57) ABSTRACT

A method and apparatus for locating and for maintaining the locations of files within a directory tree structure. A file location request is received from a program module and a response is generated containing a file location identifying the location of one or more files within a directory tree structure. The file location request contains search criteria that identifies at least one file. If the file location of the component file has changed or has never been searched, then an attempt is made to locate the file and the new file location is returned. All file locations are stored in a file location cache so that subsequent searches can be minimized. When either the search criteria does not exist in the file location cache or the directory originally containing the sought file has been modified, the requested file location is searched for and the file location cache is updated.

31 Claims, 7 Drawing Sheets

FIG. 3a

FILE LOCATION CACHE 300

| SEARCH CRITERIA | FILE LOCATION(S) | EXTRA CRITERIA | TAG |
|---|---|---|---|
| 310 { filename: x.dic <br><br> last-used date: 11/18/97 | filename: main.dic <br> directory ID: 8240 | function: default dictionary | |
| | filename: eric.dic <br> directory ID: 8240 | function: special dictionary | A |
| | filename: michael.dic <br> directory ID: 8240 | function: special dictionary | B |
| | filename: underwood.dic <br> directory ID: 8240 | function: special dictionary | C |
| 312 { function: unspecified <br> filename: main.dic <br><br> last-used date: 11/18/97 | filename: main.dic <br> directory ID: 8240 | function: default dictionary | |
| 314 { function: special dictionary <br><br><br> last-used date: 11/18/97 | filename: eric.dic <br> directory ID: 8240 | function: special dictionary | A |
| | filename: michael.dic <br> directory ID: 8240 | function: special dictionary | B |
| | filename: underwood.dic <br> directory ID: 8240 | function: special dictionary | C |
| 316 { function: special dictionary <br> tag: A <br><br> last-used date: 11/18/97 | filename: eric.dic <br> directory ID: 8240 | function: special dictionary | A |

FIG. 3b

FILE LOCATION CACHE 300'

| SEARCH CRITERIA | FILE LOCATION(S) | EXTRA CRITERIA | TAG |
|---|---|---|---|
| 310' { filename: x.dic <br><br> last-used date: 1/5/99 | filename: main.dic <br> directory ID: 8240 | function: default dictionary | |
| | filename: eric.dic <br> directory ID: 8240 | function: special dictionary | A |
| | filename: michael.dic <br> directory ID: 8260 | function: special dictionary | B |
| | filename: underwood.dic <br> directory ID: 8260 | function: special dictionary | C |
| 312' { function: unspecified <br> filename: main.dic <br><br> last-used date: 11/18/97 | filename: main.dic <br> directory ID: 8240 | function: default dictionary | |
| 314' { function: special dictionary <br><br> last-used date: 1/5/99 | filename: eric.dic <br> directory ID: 8240 | function: special dictionary | A |
| | filename: michael.dic <br> directory ID: 8260 | function: special dictionary | B |
| | filename: underwood.dic <br> directory ID: 8260 | function: special dictionary | C |
| 316' { function: special dictionary <br> tag: A <br><br> last-used date: 11/18/97 | filename: eric.dic <br> directory ID: 8240 | function: special dictionary | A |

APPARATUS AND METHOD FOR SEARCHING FOR A FILE

TECHNICAL FIELD

The present invention relates generally to searching for computer files and more particularly to an apparatus and method for increasing search efficiency and accuracy by maintaining records of a last-known location for one or more files.

BACKGROUND OF THE INVENTION

As computer programs (application programs) become more and more sophisticated, they are typically implemented with a host of component files (component files) for performing certain functions or providing particular data. It is often critical that these component files are accessible to the application program in order for the application program to be executed in an efficient manner. Unfortunately, computer users have grown accustomed to moving the component files from their original location to other locations within their computer's file system. Usually a computer's operating system will organize files in the file system by maintaining the files within a directory tree structure. If a file is moved independently of the application program, the application program may be unable to locate a component file when the component file is needed. A failure to locate the component file can result in inefficient operation, failure of a particular function, or even a failure to continue execution of the application program.

A first attempt at maintaining the location of component files involved the maintenance of a preferences file associated with a particular application program. The preferences file was used to store the location of each component file. When the application program sought to access the component file, then it could reference the preferences file to determine the location of the particular component file. Thus, if component files were moved, the application program could still determine the new location, as long as the preferences file was properly updated. Unfortunately, users commonly moved component files without updating the preferences file. The only available means of correcting the preferences file was to re-install the application program.

A second attempt at maintaining the location of component files involved the creation and maintenance of a Registry. The Registry could be implemented as a single file for an entire operating system and/or a single application program. The Registry could be automatically updated when the operating system recognized that a registered component file was moved to a different location. The problems associated with the Registry were that it was slow and fragile. If the Registry was damaged, all file location information could be lost. Similarly, the file location information in the Registry was not isolated. Thus, a change to the Registry made by one application program could adversely affect the ability of a second application program to maintain component file locations in the same Registry. If the Registry was unable to provide an application program with the needed file locations, then the application program would have to be re-installed to correct the Registry.

A reliable means for locating component files has become even more desirable in light of a current trend in application program installation requirements. In order to avoid complications associated with the installation of application programs, software developers have reduced installation requirements to the simple act of copying files from one disk to another ("drag-and-drop"). A user can now purchase a disk containing an application program and install the application program by simply copying files to the user's hard drive. The application program is then fully executable from the user's hard drive without further installation steps. Because no installation program is used, there is no way to correct a preferences file or the Registry.

Therefore, there is a need for a file maintenance system capable of enabling a drag-and-drop installation procedure while providing accurate, readily updateable, and easily accessible component file locations for the application program. The file maintenance system should also perform these functions in a time and memory conserving manner.

SUMMARY OF THE INVENTION

The present invention solves the problem of conventional component file locators by providing a searching function and a location caching function. The present invention receives a file location request from a program module and responds with a file location identifying the location of one or more component files within a directory tree structure. The file location request contains search criteria that ideally identifies at least one component file. The search request might contain search criteria having the identifying characteristics of one or more files available within the folder tree.

If the file location of the sought component file is unchanged since the component file was last accessed, then the last known file location will be returned to the requesting program module. If the file location of the component file has changed or has never been searched, then an attempt will be made to locate the component file the new file location will be returned to the program module. All file locations are stored in a file location cache so that subsequent searches can be minimized.

The file location cache can be characterized as a four-column table. In the first column is a list of each different set of search criteria that has been received as a portion of a file location request. Every time a file location request containing a new set of search criteria is received, the new set of search criteria is added to the first column of the cache and a new search record is created. The date and time of the last search criteria match is stored in the cache, regardless of whether the search criteria existed before the last search.

The second column contains a list of file locations. Each file location identifies the folder tree location of one or more component files satisfying the search criteria in the corresponding first column entry. The file location indicates the last known location of the file(s) satisfying the search criteria.

A third column of the file location cache may also be used to store "extra" search criteria. Extra search criteria is search criteria that is characteristic of a particular application program and/or component file. Generally, search criteria is defined by the operating system and includes such identifying characteristics as: file name, size, file type, label, date modified/created, version, comments, creator, etc. Extra search criteria may include other characteristics, such as the sought component file's capabilities. Extra search criteria can be used to speed subsequent searches by eliminating from consideration files that satisfy the general search criteria, but do not satisfy the extra search criteria.

A fourth column can be used to store "tags", which permit a program module to mark the component files listed in the file location cache. This marking permits the program module to narrow its search when performing subsequent searches for the marked component file.

When a file location request is received, the search criteria contained therein is identified. The search criteria is then compared to the first column of the cache to determine whether a search has been previously performed for the file location request. If the particular search has never been performed, then the entire folder tree structure (or some predefined portion thereof) will have to be searched for the requested file location.

If the search criteria does exist in the cache, then the corresponding file location in the second column is examined. A determination is made as to whether the file location is valid. The validity of the file location depends on whether the folder in which the file location resides has been modified since the last search. If the folder has been modified, then a new search is performed for the requested file location. If the folder has not been modified, then the stored file location is returned to the requesting program module.

When either the search criteria does not exist or the folder in question has been modified, the requested file location is searched for in a manner that is well known to those skilled in the computer arts. In the event that the search criteria does not exist in the cache or that the folder has been modified, then the file location cache must be updated following the subsequent search.

If the search criteria is new, then a new first column entry is created in the file location cache. The file locations that are determined by searching the directory tree structure are stored in a corresponding new second column (file locations) entry.

If a modified folder is the reason for the new search, then the second column entry corresponding to the search criteria is modified to reflect the results of the new search. This procedure effectively updates the cache, so that unnecessary, subsequent searches need not be performed.

BRIEF DESCRIPTION OF THE DRAWINGS

FIG. 2b is a block diagram of an exemplary directory tree structure that has been modified from that of FIG. 2a.

FIGS. 3a and 3b are block diagrams of exemplary file location caches.

DETAILED DESCRIPTION

An exemplary embodiment of the present invention provides a searching function and a file location caching function for maintaining the locations of component files within a directory tree structure. In an exemplary embodiment of the present invention, a file location request is received from a program module and a response is generated containing a file location identifying the location of one or more component files within a directory tree structure. The file location request contains search criteria that ideally identifies at least one component file. The search request might contain search criteria having the identifying characteristics of one or more files available within the folder tree.

If the file location of the sought component file is unchanged since the component file was last accessed, then the last known file location will be returned to the requesting program module. If the file location of the component file has changed or has never been searched, then an attempt will be made to locate the component file and the new file location will be returned to the program module. All file locations are stored in a file location cache so that subsequent searches can be minimized.

If the search criteria does exist in the cache, then the corresponding file location in the file location cache is examined. A determination is made as to whether the file location is valid. The validity of the file location depends on whether the folder in which the file location resides has been modified since the last search. If the folder has been modified, then a new search is performed for the requested file location. If the folder has not been modified, then the stored file location is returned to the requesting program module.

When either the search criteria does not exist or the folder in question has been modified, the requested file location is searched for in a manner that is well known to those skilled in the computer arts. In the event that the search criteria does not exist in the cache or that the folder has been modified, then the file location cache must be updated following the subsequent search.

An Exemplary Operating Environment

Figure 1:
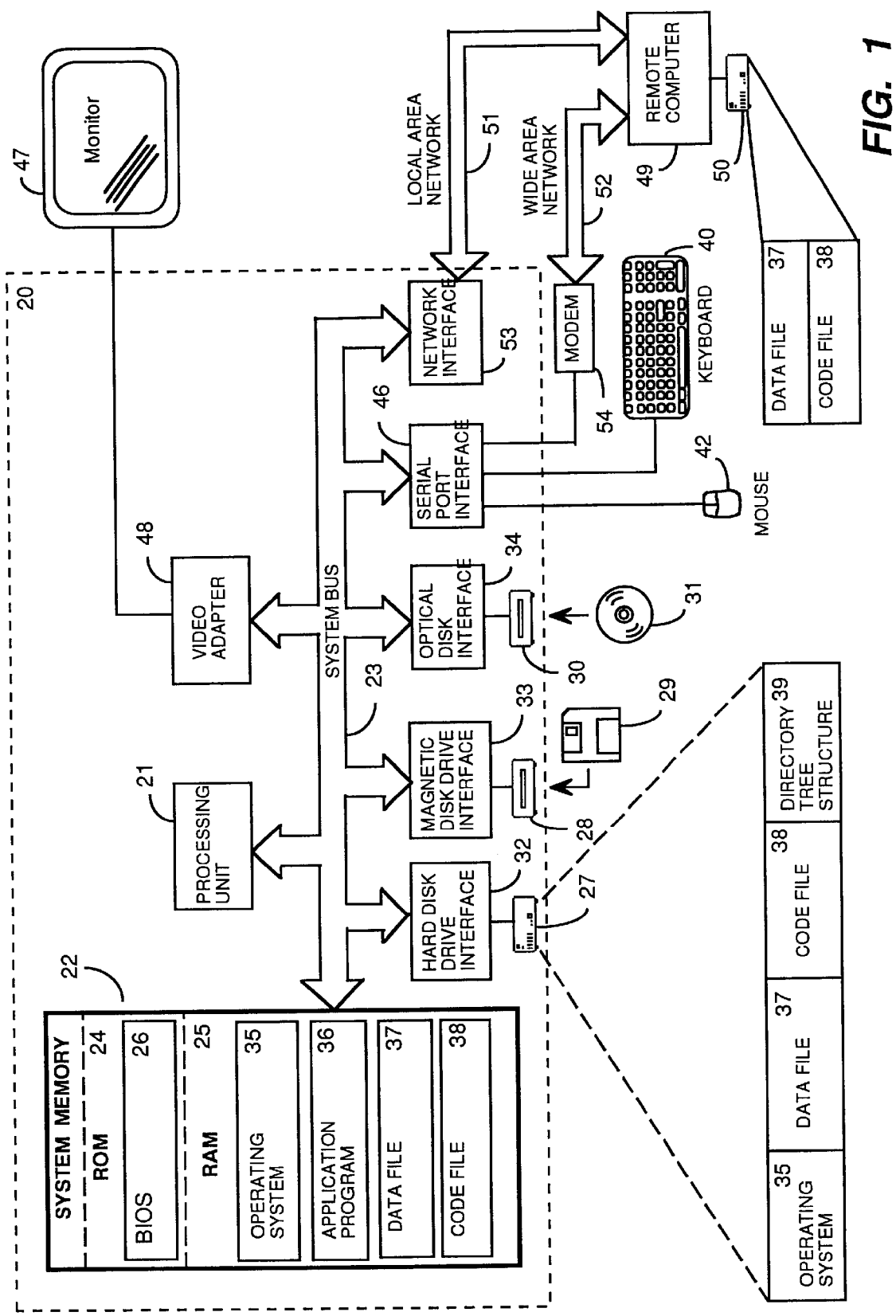
FIG. 1 is a block diagram of a personal computer that provides the operating environment for an embodiment of the present invention.

FIG. 1 and the following discussion are intended to provide a brief, general description of a suitable computing environment in which the invention may be implemented. Although the present invention is described as a stand-alone process, those skilled in the art will recognize that the invention may be implemented in combination with other program modules or as a part of a larger program module. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules and data files may be stored in the drives and RAM 25, including an operating system 35, one or more application programs 36, and component files, such as a data file 37, and a code file 38 (e.g., dynamic link library). A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Those skilled in the art will appreciate that the exemplary embodiments of the present invention described herein is independent of any one operating environment and may be utilized in many environments. The above-described environment is simply an exemplary embodiment that is described for the purposes of providing a context in which to better describe various embodiments of the present invention.

The Directory Tree Structure

Figure 2A:
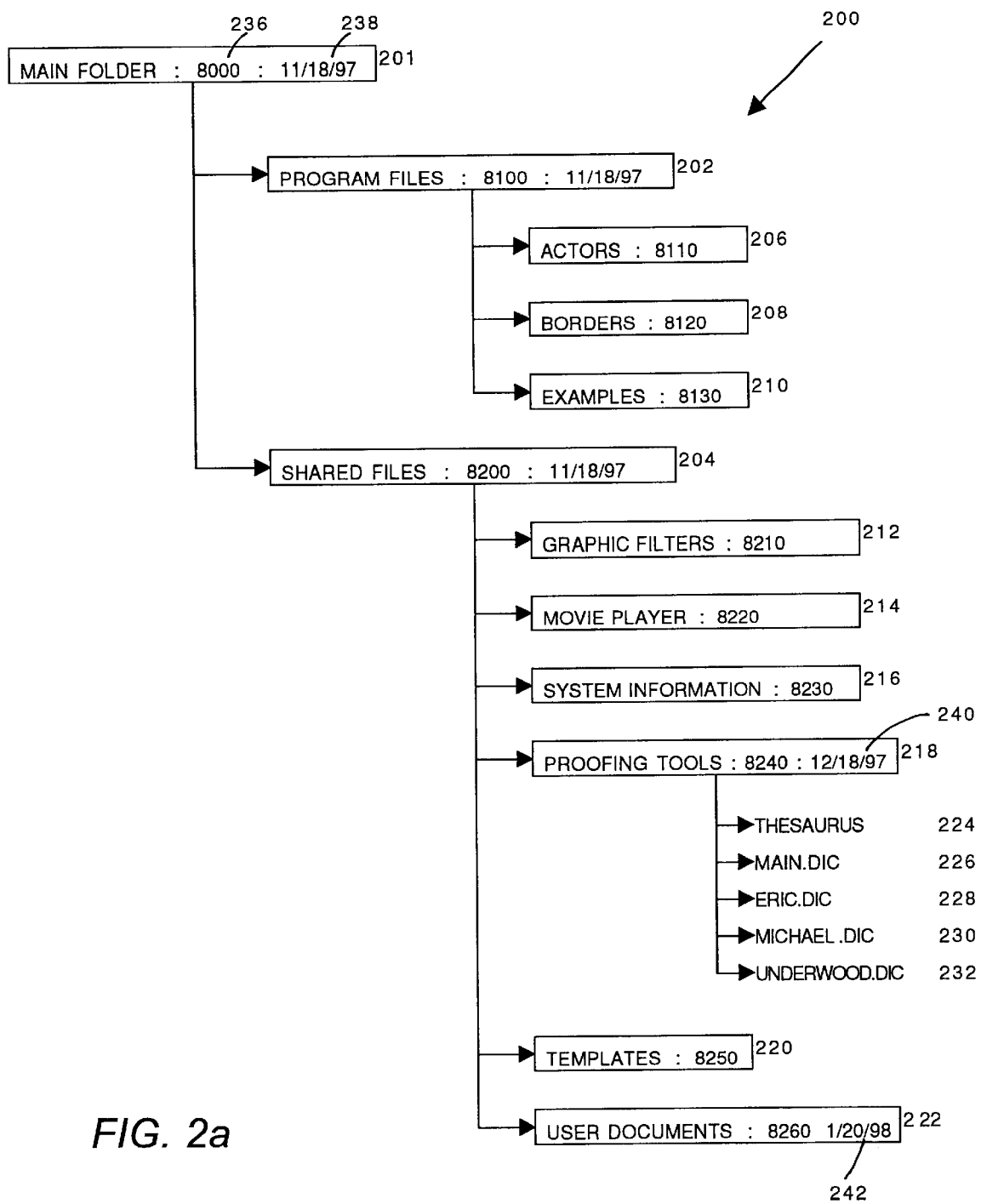
FIG. 2a is a block diagram of an exemplary directory tree structure.

Computer files are typically organized within a directory tree structure. The operating system 35 permits the user to organize files saved on a hard drive in a tree structure in order to facilitate the location of the files when they are needed. FIG. 2a depicts a block diagram illustrating an exemplary portion of a directory tree structure. In this example, the directories (i.e., folders) are represented by directory names in rectangles (201–222). Files are represented by file names standing alone (224–232). Directories can contain other directories or files.

The directory tree structure 200 provides a means for maintaining the files 224–232 and directories 201–222 in a structured hierarchy. A directory that contains other directories and/or files is said to be a parent directory, with respect to the directories and/or files that it contains. In the example depicted in FIG. 2a, the MAIN FOLDER directory 201 is the parent directory of the PROGRAM FILES directory 202 and the SHARED FILES directory 204. The SHARED FILES directory 204 is the parent directory of the PROOFING TOOLS directory 218 which is, itself, the parent directory of a group of component files 224–232.

The PROOFING TOOLS directory 218 contains a thesaurus proofing tool, the THESAURUS component file 224. The PROOFING TOOLS directory 218 also contains a set of dictionaries 226–232. An application program may utilize the dictionaries in various contexts, to proof the spelling of a document created by the application program. For example, the application might use the main.dic component file 226 to proof the spelling of normal documents, but may be configured to use the eric.dic component file 228 to proof the spelling of specific kinds of documents. If the eric.dic component file 228 is moved, then the application program must determine the new location of the eric.dic component file 228 before the application program is able to use the eric.dic component file to proof a document.

In the directory tree structure depicted in FIG. 2a, each directory has been assigned a directory identification number and a modification date. In a typical operating system, each directory has a unique directory identification number. The MAIN FOLDER directory 201 has a directory identification number 236 of "8000" and a modification date 238 of "Nov. 18, 1997", indicating that the directory was last modified on Nov. 18, 1997. This modification date means that nothing has been added, removed, or modified within the files and directories that have the MAIN FOLDER directory 201 as a parent directory, since the modification date.

It is well known in the art that a directory identification number is capable of identifying the location of a directory within such a directory tree structure. For any given directory identification number, an application program can make a call (e.g., a file location request) to the operating system and access that directory. Thus, if an application program needs to locate a particular file, and the file is located within a particular directory, then an application program can make a file location request to the operating system. The file location request may include the directory identification number and the filename of the needed file. The application program can then access the file.

Alternatively, an application program can send a file location request to the operating system to locate a particular file using only the file's filename. In this case, the operating system can search the entire directory tree structure, until it either finds the requested file or exhausts the entire directory tree structure. If the entire directory tree structure is searched, without locating the file, then a missing file alert can be generated. Other ways of locating files include following aliases or shortcuts, which are well known to those skilled in the computer arts.

Many application programs (as well as other program modules) utilize component files. Generally, component files provide data and/or functionality that can be accessed or invoked on an as-needed basis. Component files provide a means for modularizing computer files. By using component files on an as-needed basis, an application program can streamline its operation by minimizing the amount of files loaded at any one time. Because only the files that are needed are loaded, computer resources (e.g., RAM) can be conserved for other purposes. This conservation fosters more efficient operation of application programs. Therefore, it has become desirable to increase the reliability and efficiency of locating component files.

An efficient and reliable means for locating component files has become even more desirable in light of a current trend in application program installation requirements. In order to avoid complications associated with the installation of application programs, software developers have reduced installation requirements to the simple act of copying files from one disk to another ("drag-and-drop"). A user can now purchase a disk containing an application program and install the application program by simply copying files to the user's hard drive. The application program is then fully executable from the user's hard drive without further installation steps. Because no installation program is used, there is no way to correct a preferences file or the Registry.

Ideally, the component files installed by a drag-and-drop installation are maintained in their installed locations within the directory tree structure. If the component files are never moved from their installed locations, then the application program will be able to find them by looking for them in their installed locations (i.e., by specifying the directory identification number and filename). The installed location can be maintained in a preferences file, a Registry, a configuration file, or the like.

Unfortunately, users often move component files from their installed locations to other locations within the directory tree structure. In such cases, the new location of the component file is unknown to the application program, so the component file cannot be readily accessed. The application program must determine the new location in order to access the component file. The new location can be determined by searching the entire directory tree structure, but this impedes the application program's execution efficiency.

Figure 2B:
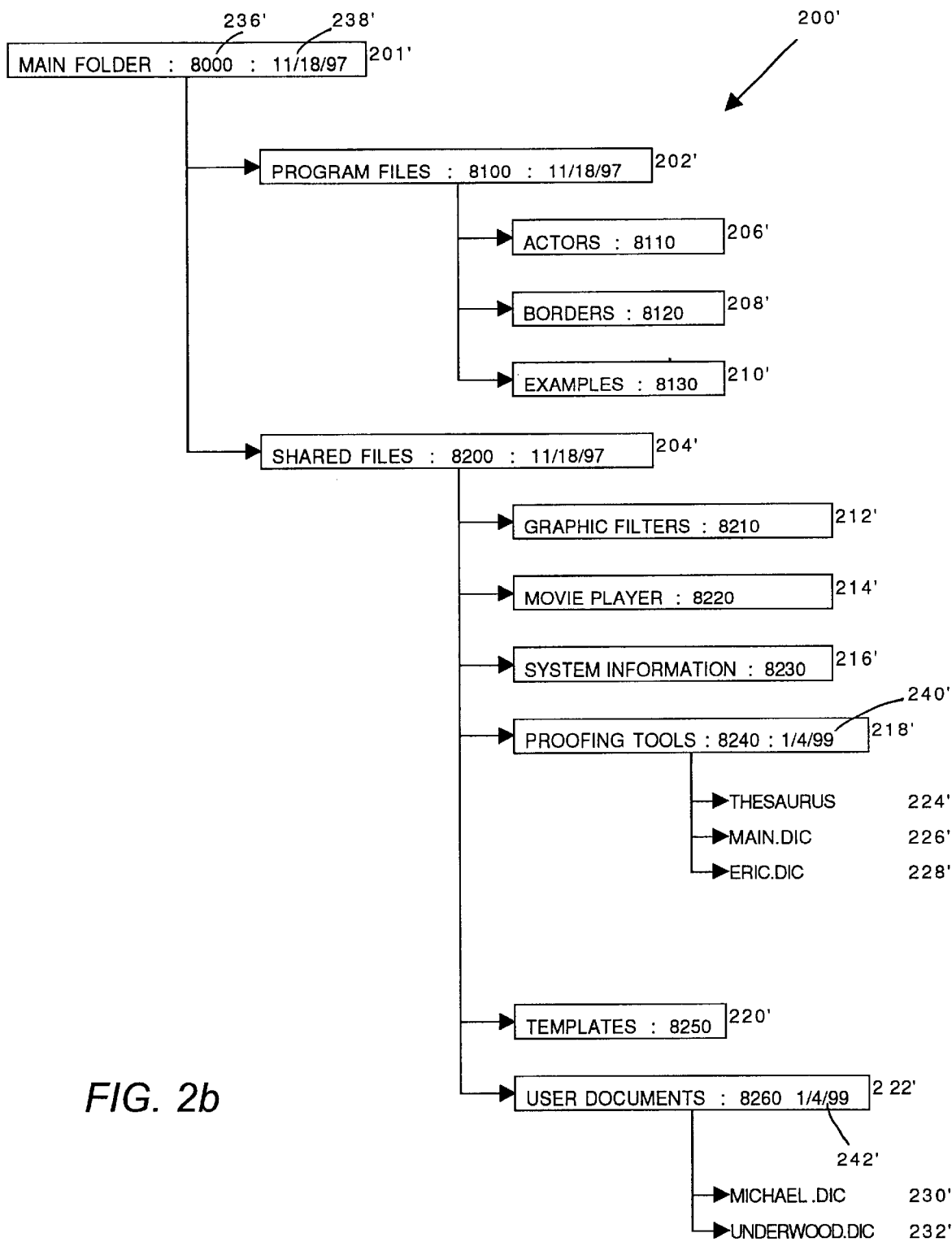

Referring now to FIG. 2b, the directory tree structure 200' includes all of the directories 201'–222' and component files 224'–232' depicted in FIG. 2a. However, the component files michael.dic 230' and underwood.dic 232' have been moved within the directory tree structure 200'. Specifically, the parent directory for component files michael.dic 230' and underwood.dic 232' has been changed from the PROOFING TOOLS directory 218' to the USER DOCUMENT directory 222'. If an application program seeks access to these component files, it will not find them in their installed locations.

Notably, the directory identification number associated with component files 230' and 232' has changed from 8240 to 8260. Because the PROOFING TOOLS directory 218' and the USER DOCUMENTS directory 222' were changed, their modification dates 240' and 242' have changed to reflect the day on which the component files 230' and 232' were moved.

An exemplary embodiment of the present invention utilizes a file location cache to maintain the locations of particular component files. Once an application program has generated a new file location request, a search record is made and the file locations of all component files meeting the search criteria contained in the file location request is saved in the file location cache. The file location cache may be initially configured to contain all of the installation locations of the relevant component files. If and when a user moves the component files to new locations, the cache may be updated to reflect the changed locations. An exemplary embodiment of the present invention uses the modification dates of the relevant directories to validate the file location cache. Thus, the application program has a single, dynamic resource for streamlining component file searches. Because the file location cache is an important component of an exemplary embodiment of the present invention, a detailed description of an exemplary file location cache follows.

The File Location Cache

Referring now to FIG. 3a, an exemplary file location cache 300 is depicted. As discussed above, an exemplary embodiment of the present invention maintains a file location cache that contains search records for component files so that subsequent searches for the same component files can be performed more efficiently. All of the component files that match a particular set of search criteria are associated with the search criteria in the file location cache in the form of a search record. Other characteristics of each component file can also be maintained within the file location cache. The contents of the file location cache of FIG. 3a correspond to the contents of the directory tree structure of FIG. 2a. The contents of the file location cache of FIG. 3b correspond to the contents of the directory tree structure of FIG. 2b.

The file location cache can be implemented as a four-column table for storing information corresponding to each set of search criteria. The Search Criteria column 302 contains the search criteria that specifies a set of component files having characteristics that satisfy the search criteria. Search criteria can be anything that can serve as an identifying characteristic of one or more files. A typical operating system will provide the functionality to search for files containing certain basic identifying characteristics. For example, most operating systems will allow users and/or application programs to search for files by filename, file type, creator, date modified, date created, etc. An exemplary file location cache will also save extra search criteria that is specific to a particular application program or component file. For example, extra search criteria may include component file functionality, a summary of file contents, or any other identifying characteristic not supported by the operating system within which the file location cache is being used.

The File Locations column 304 identifies the locations (within the directory tree structure) of the component files having characteristics that satisfy the search criteria in the Search Criteria column 302. Each entry in the File Locations column 304 includes the filename and the directory identification number of the component file's last known parent directory. Each different entry in the Search Criteria column 302 and the corresponding entries in the File Locations column, the Extra Criteria column 306, and the Tag column 308 make up a search record 310–316. Each search record contains a last-used date in the Search Criteria column. The last-used date indicates the last time that a file location request having the search criteria specified by the search record was received. The Extra Criteria column 306 and the Tag column 308 permit the file location cache 300 to contain other information pertaining to each component file in a search record.

A first search record 310 has search criteria that specifies files having filenames including the filename extension "dic". As is well known in the art, filename extensions are often used as indicators of the contents and/or functionality of a file. In this example, the "dic" extension indicates that the file is a dictionary component file. Of course, the file name extension is only one way to indicate one or more characteristics of a particular file. Other file characteristics may be used as search criteria. The use of filename extensions in this discussion is meant only to be illustrative of an exemplary means of categorizing files and is not meant to limit the utility of the described embodiment to a particular operating environment.

Referring back to the directory tree structure 200 of FIG. 2, four component files match (satisfy) the search criteria of search record 310, main.dic 226, elic.dic 228, michael.dic 230, and underwood.dic 232. These component files appear in the File Locations column 304 of search record 310. Because these component files share the parent directory PROOFING TOOLS 218, the file location column includes the directory identification number of "8240" for each component file.

A second search record 312 contains a set of search criteria that specifies a file with the filename "main.dic". This is a very specific set of search criteria, as it refers to only a single file in this example, the main.dic component file 226. As with the first search record 302, this search record indicates the location of the main.dic file 226 (directory identification number "8240") and contains a last-used date field, reflecting the last time the search record was accessed.

A third search record 314 contains a set of search criteria that specifies a file having the function of a "special dictionary". Because this search criteria is not typically supported by the operating system, it is referred to as "extra criteria", and invokes the functionality provided by information in the Extra Criteria column 306. As stated above, the Extra Criteria column 306 can contain identifying characteristics of a component file that pertain to a particular application program or a particular use. In this example, the main.dic file 226 has been identified as a default dictionary, while the eric.dic 228, michael.dic 230, and underwood.dic 232 files have been identified as special dictionaries. Thus only the eric.dic 228, michael.dic 230, and underwood.dic 232 files satisfy the search criteria in the Search Criteria column 302 of the third search record 314.

Advantageously, an application program (or any other program module capable of accessing the file location cache) can open a component file, examine its contents and/or functionality, and record the results of this examination (i.e., the extra criteria) in the Extra Criteria column 306 corresponding to the search record invoked. Subsequent searches can then utilize the extra search criteria to identify the component file, without having to re-open the component file to ascertain its contents and/or functionality characteristics. Thus, subsequent searches are performed more efficiently.

The Tag column 308 provides the capability to mark certain component files with an identifying "tag". A fourth search record 316 contains search criteria identical to that of the third search record 314, with the exception of an additional tag. The tag search criteria identifies the tag "A". Thus, the search record indicates that only the eric.dic file 228 meets the search criteria of having the functionality of a special dictionary and an "A"tag. Advantageously, an application program can further streamline searches by marking a file within a particular search record with a tag that permits the application program to quickly distinguish between similar component files. In this example, the component files having "special dictionary" functionality, eric.dic 228, michael.dic 230, and underwood.dic 232, are distinguishable from one another by their tags.

Referring now to FIG. 3b, the file location cache 300' is depicted as it would appear after being updated to reflect the changes made to the directory tree structure of FIGS. 2a and 2b. As discussed in connection with FIG. 2b, the directory identification numbers associated with component files michael.dic 230 and underwood.dic 232 have been changed to reflect the fact that these component files have been moved from the PROOFING TOOLS directory 218 (FIG. 2b) to the USER DOCUMENTS directory 222 (FIG. 2b). Because the file location cache has been updated, subsequent searches for these files will be directed to the proper file locations. An exemplary method for maintaining accurate file location records in the file location cache is discussed below in connection with FIGS. 4 and 5.

Those skilled in the art will appreciate that the file location cache can be initially constructed to reflect the installed locations of all of the component files. Such a file location cache can be implemented with a particular application program, for example, by storing the file location cache in a preferences file associated with the application program. Alternatively, it can be implemented as a stand-alone program module that is accessible by more than one application program and/or other program module. It will also be appreciated that the file location cache can be used for any type of computer file and need not be limited to maintaining the location of component files.

An Exemplary File Searching Method

Figure 4:
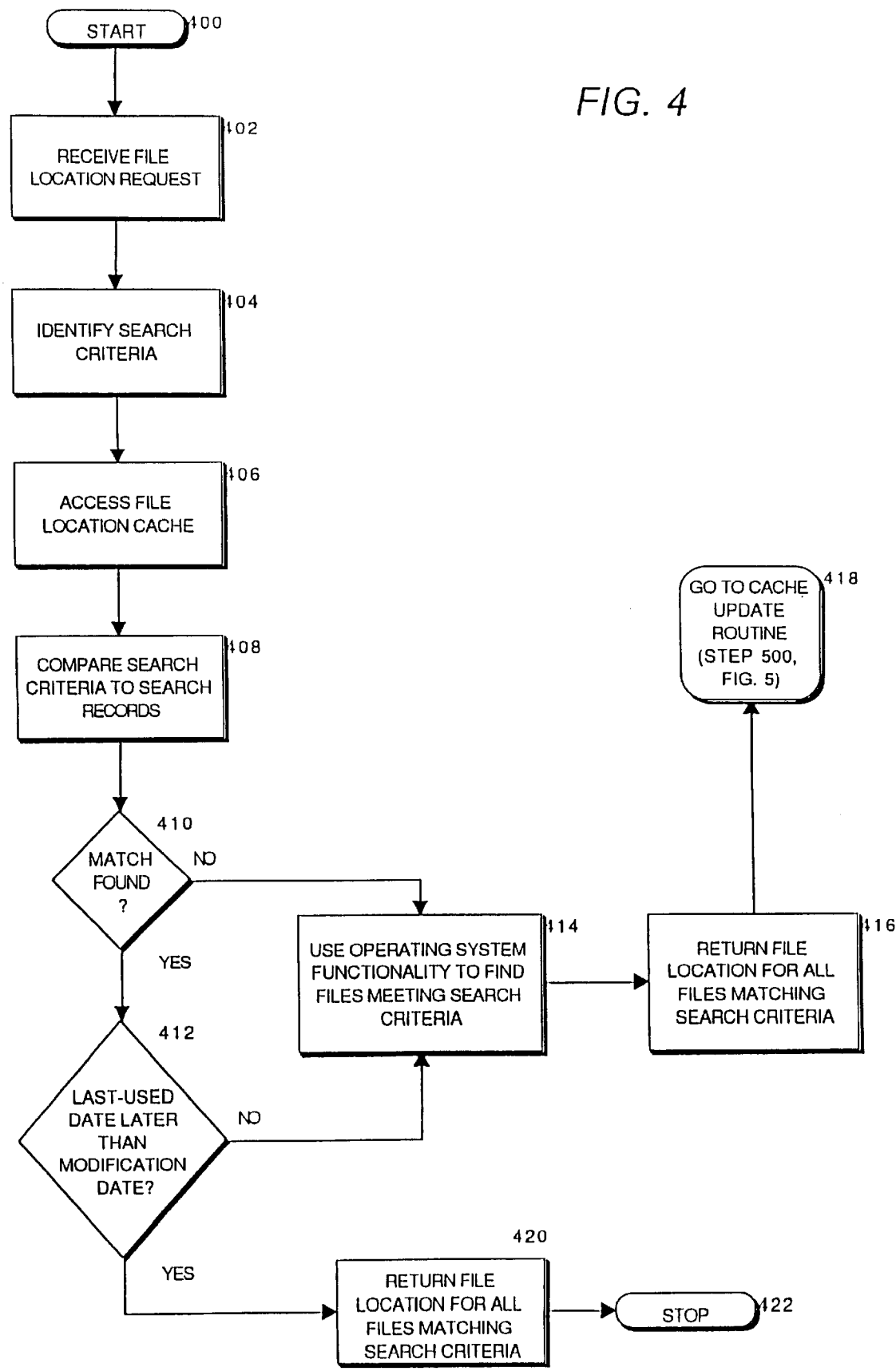
FIG. 4 is a flowchart illustrating an exemplary file searching method.

Referring now to FIG. 4, an exemplary method for finding a component file with a file location cache is depicted. The method starts at step 400 and proceeds to step 402, wherein a file location request is received. The method then proceeds to step 404 at which the search criteria contained in the file location request is identified. The search criteria will usually be formatted as part of a function call as a parameter or list of parameters. Once the search criteria has been determined, the method proceeds to step 406. At step 406, the file location cache is accessed. Typically, this step will require opening a file location cache file or accessing a preferences file that contains the file location cache. For the purposes of this discussion, a preferences file will be used to refer to any file capable of storing or maintaining environment dependent or user specified application settings or variables.

After the file location cache has been accessed, the search criteria of the file location request is compared to the search criteria of the search records in the file location cache, at step 408. At decision block 410, a determination is made as to whether a match is found. If a match is found, then the method branches to decision block 412.

At decision block 412, a determination is made as to whether the last-used date of the matching search record is later than the modification date of each parent directory identified in the search record. If a parent directory has been modified after the last-used date of the search record, then an assumption is made that the file location information is no longer valid and the method branches to step 414. On the other hand, if no parent directory has been modified after the last-used date, then an assumption is made that the file location information contained in the search record is valid and the method branches to step 420.

At step 420, all of the file locations of the files matching the search criteria are returned. Typically, the file locations will be identified to an application program that may open one or more of the files at those locations or take further steps to determine the particular file that the application program needs. After the file locations are returned, the method ends.

Returning to decision block 410, if no match is found between the search criteria of the file location request and the search criteria of the search records in the file location cache, then the method branches to step 414. Similarly, at decision block 412, if a file location has been assumed to be invalid, then the method branches to step 414.

At step 414, the search criteria is used to invoke the searching capabilities of the operating system (or any other available search capabilities). This search will typically be limited to conventional search criteria (i.e., no extra criteria) and will be inefficient. One way to reduce the inefficiency of this search is to limit the search to a predetermined portion of the directory tree structure. Another way to reduce inefficiency is to limit the depth (or sub-directories) into the directory tree structure that the search will probe. An exhaustive search (i.e., all directories in the directory tree structure) will ensure a determination of the location or non-existence of a particular file, but is too inefficient for the purposes of most application programs.

After the operating system-based search is performed, the results of that search (i.e., file locations) are returned at step 416. The method then proceeds to step 418 and on to the file location cache updating method depicted in FIG. 5. Notably, there are two situations in which more than one file may be processed by the method. First, a search record may contain multiple files, as discussed in connection with FIGS. 3a and 3b. Second, the search criteria of a particular file location request may match more than one search record. In either case, steps shown in FIG. 4 may be repeated for each file and/or each search record involved. However, this repetition is not shown in FIG. 4 for the sake of simplicity.

An Exemplary File Location Cache Updating Method

Figure 5:
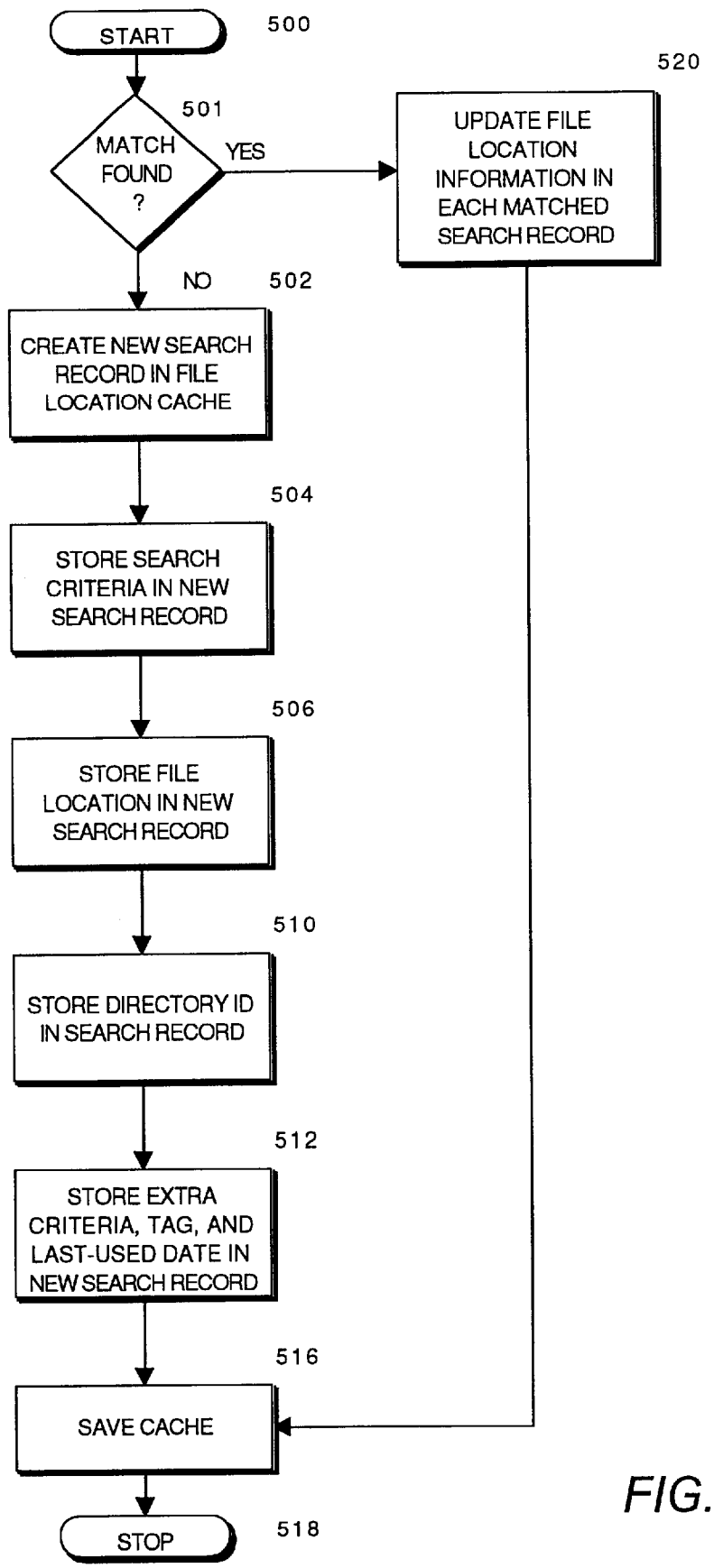
FIG. 5 is a flowchart illustrating an exemplary method for updating a cache.

Turning now to FIG. 5, an exemplary method for updating a file location cache is depicted. The method starts at step 500 and proceeds to decision block 502. At decision block 502, a determination is made as to whether a match was made between the search criteria of the file location request and the search criteria of the search records in the file location cache. If a match is found, then the search record must be updated to reflect the changed directory tree structure and the method branches to step 520. On the other hand, if a match is not found, then a new search record must be created and the method branches to step 502. In either case, the file location cache will be updated to accurately reflect the changed directory tree structure.

At step 520, the file location information in the file location cache is updated to accurately reflect the changed directory tree structure. Once the file location cache has been updated, then the method proceeds to step 516 and the cache is saved to protect the newly modified file location cache. The method then proceeds to step 518 and stops.

At step 502, a new search record is created in the file location cache. The method then proceeds to step 504, wherein the search criteria that was contained in the file location request is stored in the new search record. The method proceeds to step 506, wherein the file location is stored in the new search record. Of course, if multiple files were found during the search, then more than one file location will be stored in the new search record. The method then proceeds to step 510, wherein the directory identification number corresponding with each file is stored in the new search record. The method then branches to step 512. At step 512, the extra criteria (if any), tag (if any), and last-used date are stored in the new search record.

Once the new search record has been added to the file location cache, then the method proceeds to step 516 and the cache is saved to protect the newly modified file location cache. The method then proceeds to step 518 and stops.

Although the description of the updating method is directed to the storage of particular types of information in the file location cache, those skilled in the art will appreciate that virtually any information could be stored in the cache by the exemplary cache updating method described. The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

I claim:

1. A method for determining a file location of a component file accessed by a program module, comprising the steps of:
    (a) receiving a component file location request for a component file that is being accessed by a program module, said component file location request including criteria identifying the component file;
    (b) comparing the criteria included in the component file location request to at least one search record in a file location cache, the file location cache including a plurality of search records, wherein each of the search records includes search criteria and component file location;
    (c) in response to a match between the criteria of the file location request and the search criteria of at least one search record, determining a modification status for a directory tree folder referenced in the component file location included in said at least one search record; and
    (d) in response to a determination that the modification status is unchanged, returning the component file location included in said at least one search record as a valid file location for the component file that was requested.

2. The method of claim 1, wherein the file location comprises a location of a single file within a directory tree structure.

3. The method of claim 1, wherein the file location comprises locations of more than one file within a directory tree structure.

4. The method of claim 1, wherein the step of determining the modification status comprises the steps of:
    (a) comparing a modification date of a parent directory corresponding to the component file location to a last-used date of the search record with matching search criteria;
    (b) setting the modification status to changed if the modification date of the parent directory is later than the last-used date of the search record with matching criteria; and
    (c) setting the modification status to unchanged if the last-used date of the search record with matching criteria is later than the modification date of the parent directory.

5. The method of claim 4, further comprising the step of updating the search record in response to a determination that the modification status is changed.

6. The method of claim 5, wherein the step of updating the search record comprises the steps of:
   determining a new file location; and
   storing the new file location in the search record.

7. The method of claim 1, further comprising the step of determining a new file location in response to a failure to match the criteria of the file location request to the search criteria of the at least one record.

8. The method of claim 7, further comprising the step of creating a new search record including the new file location and the criteria of the file location request.

9. The method of claim 8, further comprising the step of storing extra criteria, a tag, and a new last-used date in the new search record.

10. A machine readable medium storing machine instructions that cause a processor to perform the steps of claim 1.

11. A file location cache having a plurality of search records used for maintaining a location of component files that are utilized by a program module wherein the location is defined in regard to a directory tree structure, the file location cache comprising:
   (a) a search criteria entry that includes at least one identifying characteristic of at least one component file;
   (b) a last-used date of the search criteria entry; and
   (c) a file location entry identifying at least one location within the directory tree structure where a component file matching the search criteria is located, said directory tree structure including a modification date on which each folder was last modified, said modification date used with the last-used date of the search criteria entry in the search record for determining whether a folder referenced in the file location entry has been modified since the last-used date of the search criteria entry.

12. The file location cache of claim 11, further comprising:
   (a) an extra criteria entry comprising at least one extra identifying characteristic of at least one file; and
   (b) a tag entry comprising a means for marking at least one file.

13. The file location cache of claim 12, wherein at least one of the extra identifying characteristics indicates the functionality of at least one file.

14. The file location cache of claim 11, wherein at least one of the identifying characteristics is a file type.

15. The file location cache of claim 11, wherein at least one of the identifying characteristics is a filename.

16. A method for ascertaining and storing a location of a component file accessed by a program module, wherein the location of the component file is referenced to a folder in a directory tree structure, the method comprising the steps of:
   (a) receiving a file location request from the program module, the file location request comprising a search criteria for a specific component file;
   (b) accessing a file location cache;
   (c) determining whether the file location cache includes an entry that matches the search criteria;
   (d) in response to a determination that the file location cache includes the entry that matches the search criteria for the specific component file, determining whether contents of said folder in the directory tree structure has changed;
   (e) if the contents of said folder in the directory tree structure has changed, searching for a new file location for the specific component file in the directory tree structure;
   (f) in response to finding the new file location, storing in the file location cache, the new file location as the location of the component file; and otherwise,
   (g) retaining in the file location cache the location of the component file previously referenced to said folder.

17. The method of claim 16, wherein the folder in the directory tree structure has a corresponding modification date and wherein the entry that matches the search criteria has a corresponding last-used date.

18. The method of claim 17, wherein the step of determining whether contents of said folder in the directory tree structure has changed comprises the steps of:
   (a) comparing the modification date of the folder to the last-used date of the entry that matches the search criteria;
   (b) in response to the modification date being later than the last-used date, identifying the contents of the folder as being changed; and
   (c) in response to the modification date being earlier than the last-used date, identifying the contents of the folder as being unchanged.

19. The method of claim 16, wherein the location of the component file comprises a location of a single file within the directory tree structure.

20. The method of claim 16, wherein the location of the component file comprises locations of more than one file within the directory tree structure.

21. The method of claim 20, wherein the file location cache comprises at least one search record, each search record comprising an entry of search criteria and the location of the component file.

22. The method of claim 21, wherein the search record further comprises at least one extra criteria entry and at least one tag.

23. The method of claim 21, further comprising the step of creating a new search record in response to a determination that the file location cache does not include the entry that matches the search criteria.

24. A machine readable medium storing machine instructions that cause a processor to perform the steps of claim 16.

25. A method for enabling component files used by a program module to be located in a directory tree structure, comprising the steps of:
   (a) providing a file location cache that includes at least one search record, wherein each search record is associated with:
      (i) search criteria for identifying a directory location of one or more component files in the directory tree structure; and
      (ii) a last known directory location in the directory tree structure for said one or more component files;
   (b) receiving a file location request from the program module for a desired component file, wherein the file location request identifies at least one property associated with the desired component file;
   (c) comparing the at least one property of the file location request to the search criteria of search records in the file location cache;
   (d) in response to a match between the at least one property and the search criteria of the at least one search record, determining a modification status of the last known directory location associated with the search criteria; and
   (e) in response to a determination that the modification status is unchanged, indicating to the program module that the desired component file is in the last known directory location.

26. The method of claim 25, further comprising the steps of:
- (a) in response to a determination that the modification status is changed, initiating a search of the directory tree structure for a new directory location of the desired component file, based on the search criteria;
- (b) updating the search record for the desired component file with the new directory location; and
- (c) indicating to the program module the new directory location.

27. The method of claim 25, wherein the step of determining the modification status comprises the steps of:
- (a) comparing a modification date of the last known directory location in the directory tree structure to a last-used date associated with the search record for the desired component file;
- (b) setting the modification status to changed if the modification date is later than the last-used date; and otherwise
- (c) setting the modification status to unchanged if the modification date is earlier than the last-used date.

28. A machine readable medium storing machine instructions that cause a processor to perform the steps of claim 25.

29. A system for determining a file location of a component file accessed by a program module, comprising:
- (a) a processor;
- (b) a storage, in communication with the processor, in which a file location cache is stored; and
- (c) a memory in communication with the processor, said memory storing machine instructions that cause the processor to perform the following functions:
  - (i) receive a component file location request for a component file that is being accessed by a program module, said component file location request including criteria identifying the component file;
  - (ii) compare the criteria included in the component file location request to at least one search record in a file location cache, the file location cache including a plurality of search records, wherein each of the search records includes search criteria and component file location;
  - (iii) in response to a match between the criteria of the file location request and the search criteria of at least one record, determine a modification status for a directory tree folder referenced in the component file location included in said at least one search record; and
  - (iv) in response to a determination that the modification status is unchanged, return the component file location included in said at least one search record as a valid file location for the component file that was requested.

30. A system for ascertaining and storing a location of a component file accessed by a program module, wherein the location of the component file is referenced to a folder in a directory tree structure, comprising:
- (a) a processor;
- (b) a storage in communication with the processor, said storage storing a file location cache; and
- (c) a memory in communication with the processor, said memory storing machine instructions that cause the processor to perform the following functions:
  - (i) receive a file location request from the program module, the file location request comprising a search criteria for a specific component file;
  - (ii) accessing the file location cache;
  - (iii) determine whether the file location cache includes an entry that matches the search criteria;
  - (iv) in response to a determination that the file location cache includes the entry that matches the search criteria for the specific component file, determine whether contents of said folder in the directory tree structure has changed;
  - (v) if the contents of said folder in the directory tree structure has changed, search for a new file location for the specific component file in the directory tree structure;
  - (vi) in response to finding the new file location, store the new file location as the location of the component file, in the file location cache; and otherwise,
  - (vii) retain the location of the component file previously referenced to said folder in the file location cache.

31. A system for determining a file location of a component file accessed by a program module, comprising:
- (a) a processor;
- (b) a storage in communication with the processor, said storage storing a file location cache; and
- (c) a memory in communication with the processor, said memory storing machine instructions that cause the processor to perform the following functions:
  - (i) provide a file location cache that includes at least one search record, wherein each search record is associated with:
    - (1) search criteria for identifying a directory location of one or more component files in the directory tree structure; and
    - (2) a last known directory location in the directory tree structure for said one or more component files;
  - (ii) receive a file location request from the program module for a desired component file, wherein the file location request identifies at least one property associated with the desired component file;
  - (iii) compare the at least one property of the file location request to the search criteria of search records in the file location cache;
  - (iv) in response to a match between the at least one property and the search criteria of the at least one search record, determine a modification status of the last known directory location associated with the search criteria; and
  - (v) in response to a determination that the modification status is unchanged, indicate to the program module that the desired component file is in the last known directory location.

* * * * *

UNITED STATES PATENT AND TRADEMARK OFFICE
CERTIFICATE OF CORRECTION

PATENT NO.   : 6,370,549 B1
DATED        : April 9, 2002
INVENTOR(S)  : Saxton

It is certified that error appears in the above-identified patent and that said Letters Patent is hereby corrected as shown below:

<u>Title page, Item [54] and Column 1, line 1,</u>
Please replace the title in its entirety with -- MAINTAINING A CACHE FOR STORING LOCATIONS OF COMPONENT FILES USED BY A PROGRAM --

Signed and Sealed this

First Day of October, 2002

Attest:

Attesting Officer

JAMES E. ROGAN
*Director of the United States Patent and Trademark Office*